(No Model.)

J. E. NIETH & C. L. THOMAS.

MOWER.

No. 357,330. Patented Feb. 8, 1887.

WITNESSES:

INVENTOR:

BY

ATTORNEYS.

UNITED STATES PATENT OFFICE.

JAMES EDWARD NIETH AND CHARLES L. THOMAS, OF INDEPENDENCE, IOWA.

MOWER.

SPECIFICATION forming part of Letters Patent No. 357,330, dated February 8, 1857.

Application filed July 3, 1886. Serial No. 207,089. (No model.)

*To all whom it may concern:*

Be it known that we, JAMES EDWARD NIETH and CHARLES LOUIS THOMAS, both of Independence, in the county of Buchanan and State of Iowa, have invented a new and useful Improvement in Mowers, of which the following is a full, clear, and exact description.

Reference is to be had to the accompanying drawings, forming a part of this specification, in which similar letters of reference indicate corresponding parts in all the figures.

Figure 1:
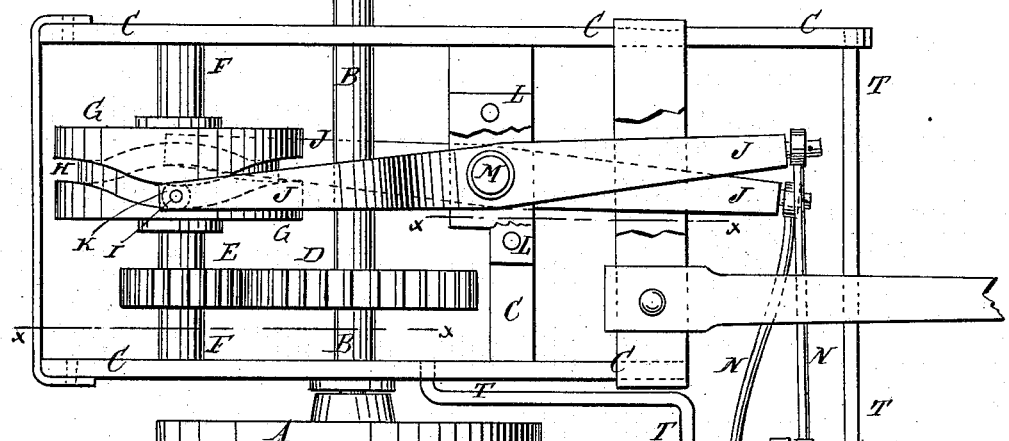
Figure 3:
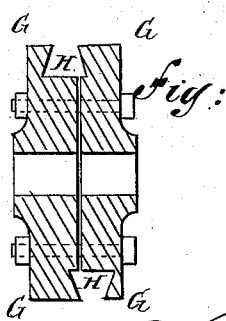
Figure 2:
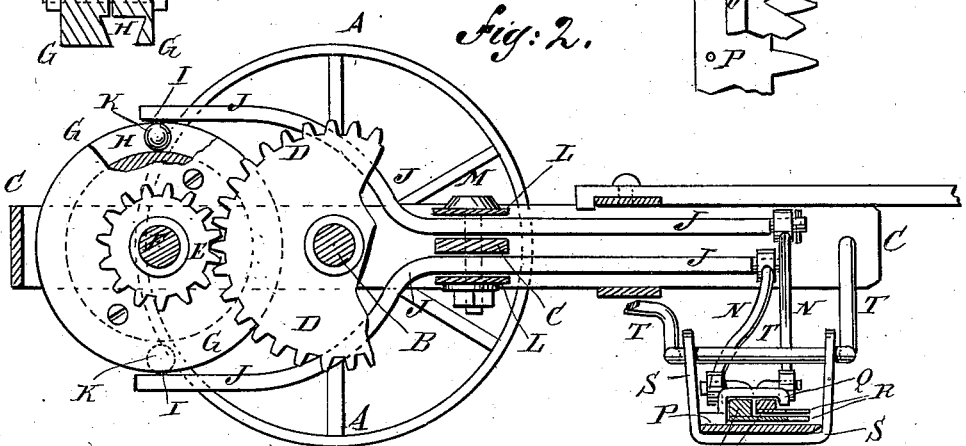

Figure 1 is a plan view of our improved mower, parts being broken away. Fig. 2 is a sectional side elevation of the same, taken through the broken line $x\ x\ x\ x\ x\ x$, Fig. 1. Fig. 3 is a sectional elevation of the cam-wheel.

The object of this invention is to provide mowers constructed in such a manner that they will operate with less friction than ordinary mowers, and thus require less power to run them, while being simple in construction and not liable to get out of order.

The invention consists in the construction and combination of various parts of the machine, as will be hereinafter fully described, and then claimed.

A are the drive-wheels, one or both of which are rigidly connected with the axle B, so as to carry the said axle with them in their revolution. The axle B revolves in bearings in the frame C, and to it is attached a large gear-wheel, D, the teeth of which mesh with the teeth of the smaller gear-wheel, E, attached to the shaft F. The shaft F is journaled in bearings in the rear parts of the side bars of the frame C, and to it is secured the cam-wheel G, in the face of which is formed a zigzag or cam groove, H, to receive, at diametrically-opposite points, pins I, attached to the rear ends of the levers J. The groove H is made dovetailed, or wider at its inner part than at its outer part, to receive the balls K, pivoted on the pins I, to lessen the friction and to keep the rear ends of the levers J in place against the upper and lower sides of the wheel G. The cam-wheel G is made in two parts bolted together, the plane of division following the groove H, so that the balls K can be readily placed in the said groove.

The levers J are curved toward each other at the forward side of the cam-wheel G, and are pivoted at their middle parts to the upper and lower sides of the central cross-bar of the frame C, and to keepers L, attached to the said upper and lower sides of the said cross-bar by a bolt, M, passing through the said cross-bar and keepers.

The forward parts of the levers J are parallel, and to their forward ends are pivoted the inner ends of the two pitmen N. The outer ends of the pitmen N are pivoted to the inner ends of the two cutter-bars O, which are placed side by side upon the finger-bar P, where they are kept in place by keepers Q, attached to the said finger-bar P. The cutters R, attached to the lower side of the rear cutter-bar O, rest and slide upon the finger-bar P, and the cutters R of the forward cutter-bar O rest and slide upon the cutters of the rear cutter-bar. The cutters R of the rear bar O are made so much longer than the cutters R of the forward bar O that the forward ends of the cutters of the two bars will be in the same vertical plane.

The cam-groove H of the wheel G is so formed that the levers J, and consequently the cutter-bars O, will always move in opposite directions, so that the cutters will operate with a shear cut.

The inner shoe, S, of the finger-bar P is made with upwardly-projecting arms, to the upper ends of which is hinged the frame T. The forward bar of the frame T projects across the front of the machine, and its end is hinged to the forwardly-projecting end of the side bar of the frame C. The rear bar of the frame T is bent to the rearward, and then inward, and its end is hinged to the side bar of the frame C, a little in front of the axle B. With this construction the hinging of the shoe S to the frame T allows the finger-bar P to be turned up into a vertical position for convenience in passing from place to place, and also, in connection with the hinging of the frame T to the frame C, allows the said finger-bar to adjust itself to the surface of the ground.

Having thus fully described our invention, what we claim as new, and desire to secure by Letters Patent, is—

1. The combination, with the main frame C, the axle B, having the wheels A, the gear D, the shaft F, having the gear E, engaging the gear D, and the two-part cam-wheel G, having a peripheral groove, of the two pivoted levers J, extending at their rear ends to the upper and lower sides of the cam-wheel and provided with pins entering the groove therein at diametrically opposite points, the frame T, hinged to the main frame, the finger-bar hinged to the side bar of frame T, the two cutter-bars, and pitmen connecting them with the forward ends of the levers J, substantially as set forth.

2. The combination, with the cam-wheel G, formed in two parts bolted together and provided with a peripheral dovetail groove, H, and means for operating the wheel, of the pivoted levers J, having pins I entering the groove at opposite points, and having balls K loosely mounted thereon and held in the groove by its dovetail form, the pitman, and the two cutter-bars operated thereby, substantially as set forth.

JAMES EDWARD NIETH.
CHAS. L. THOMAS.

Witnesses:
CHAS. LYTZE,
J. M. BURNETT.